United States Patent [19]
Otani

[11] Patent Number: 5,301,191
[45] Date of Patent: Apr. 5, 1994

[54] ADAPTIVE SWITCHING OF MULTIMEDIA AUDIO AND VIDEO INFORMATION IN AN ISDN LINE

[75] Inventor: Masatoshi Otani, Yokohama, Japan

[73] Assignee: Canon Kabushiki Kaisha, Tokyo, Japan

[21] Appl. No.: 824,182

[22] Filed: Jan. 22, 1992

[30] Foreign Application Priority Data

Jan. 22, 1991 [JP] Japan .................................. 3-005704
Jan. 24, 1991 [JP] Japan .................................. 3-024129

[51] Int. Cl.⁵ .............................................. H04J 3/22
[52] U.S. Cl. ................................. 370/84; 370/110.1
[58] Field of Search ............... 370/84, 79, 110.1, 108, 370/60, 94.1; 379/53, 54; 358/335, 341, 342, 343, 141

[56] References Cited

U.S. PATENT DOCUMENTS

| | | | |
|---|---|---|---|
| 3,534,264 | 10/1970 | Blasbalg et al. | 370/84 |
| 4,864,562 | 9/1989 | Murakami et al. | 370/84 |
| 5,042,028 | 8/1991 | Ogawa | 370/110.1 |
| 5,063,587 | 11/1991 | Semasa et al. | 379/53 |

*Primary Examiner*—Douglas W. Olms
*Assistant Examiner*—Shick Hom
*Attorney, Agent, or Firm*—Fitzpatrick, Cella, Harper & Scinto

[57] ABSTRACT

A multimedia communication apparatus so adapted that when the transmission speed of video information on a communication line is inadequate, transmission of the video information is suspended and notification is given of the fact that suspension of transmission is in effect. When communication is on hold, only prescribed media information is transmitted and needless connections are cancelled. In response to a designation releasing the apparatus from the holding state, the connection state which prevailed prior to hold is promptly restored and communication is resumed.

10 Claims, 19 Drawing Sheets

| SUB-MULTIFRAME NO. | FRAME NO. | FRAME ALIGNMENT SIGNAL (FAS) | | | | | | | |
|---|---|---|---|---|---|---|---|---|---|
| | | b1 | b2 | b3 | b4 | b5 | b6 | b7 | b8 |
| 1 | 0 | N1 | 0 | 0 | 1 | 1 | 0 | 1 | 1 |
| | 1 | 0 | 1 | A | E | C1 | C2 | C3 | C4 |
| 2 | 2 | N2 | 0 | 0 | 1 | 1 | 0 | 1 | 1 |
| | 3 | 0 | 1 | A | E | C1 | C2 | C3 | C4 |
| 3 | 4 | N3 | 0 | 0 | 1 | 1 | 0 | 1 | 1 |
| | 5 | 1 | 1 | A | E | C1 | C2 | C3 | C4 |
| 4 | 6 | N4 | 0 | 0 | 1 | 1 | 0 | 1 | 1 |
| | 7 | 0 | 1 | A | E | C1 | C2 | C3 | C4 |
| 5 | 8 | N5 | 0 | 0 | 1 | 1 | 0 | 1 | 1 |
| | 9 | 1 | 1 | A | E | C1 | C2 | C3 | C4 |
| 6 | 10 | R1 | 0 | 0 | 1 | 1 | 0 | 1 | 1 |
| | 11 | 1 | 1 | A | E | C1 | C2 | C3 | C4 |
| 7 | 12 | R2 | 0 | 0 | 1 | 1 | 0 | 1 | 1 |
| | 13 | R3 | 1 | A | E | C1 | C2 | C3 | C4 |
| 8 | 14 | TE | 0 | 0 | 1 | 1 | 0 | 1 | 1 |
| | 15 | R4 | 1 | A | E | C1 | C2 | C3 | C4 |

FIG. 2

| SUB-MULTIFRAME NO. | FRAME NO. | FRAME ALIGNMENT SIGNAL (FAS) b9 b10 b11 b12 b13 b14 b15 b16 |
|---|---|---|
| 1 | 0 | B0 B1 B2 B3 B4 B5 B6 B7 |
| | 1 | P2 P1 P0 P4 P3 P5 P6 P7 |
| 2 | 2 | B0 B1 B2 B3 B4 B5 B6 B7 |
| | 3 | P2 P1 P0 P4 P3 P5 P6 P7 |
| 3 | 4 | B0 B1 B2 B3 B4 B5 B6 B7 |
| | 5 | P2 P1 P0 P4 P3 P5 P6 P7 |
| 4 | 6 | B0 B1 B2 B3 B4 B5 B6 B7 |
| | 7 | P2 P1 P0 P4 P3 P5 P6 P7 |
| 5 | 8 | B0 B1 B2 B3 B4 B5 B6 B7 |
| | 9 | P2 P1 P0 P4 P3 P5 P6 P7 |
| 6 | 10 | B0 B1 B2 B3 B4 B5 B6 B7 |
| | 11 | P2 P1 P0 P4 P3 P5 P6 P7 |
| 7 | 12 | B0 B1 B2 B3 B4 B5 B6 B7 |
| | 13 | P2 P1 P0 P4 P3 P5 P6 P7 |
| 8 | 14 | B0 B1 B2 B3 B4 B5 B6 B7 |
| | 15 | P2 P1 P0 P4 P3 P5 P6 P7 |

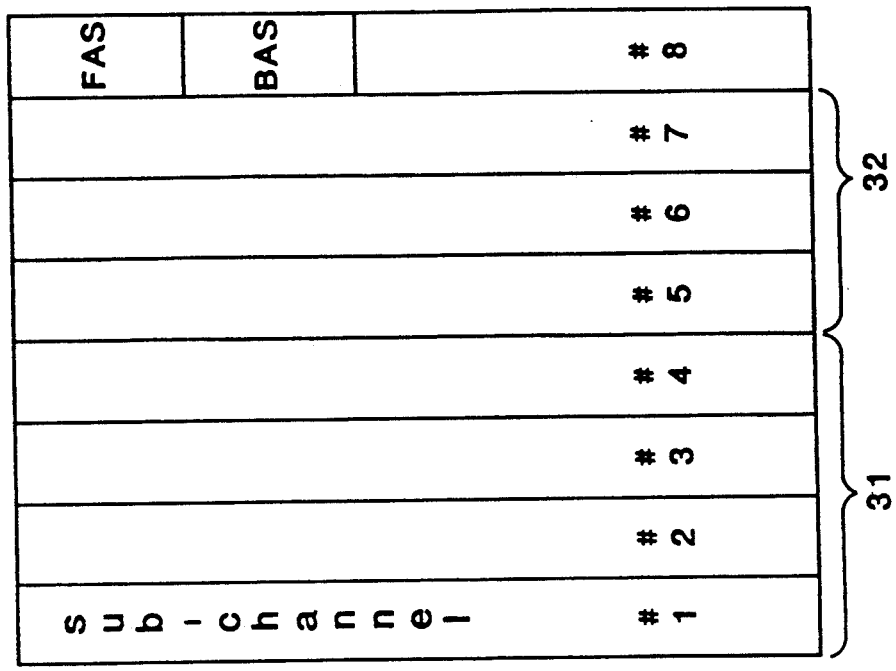
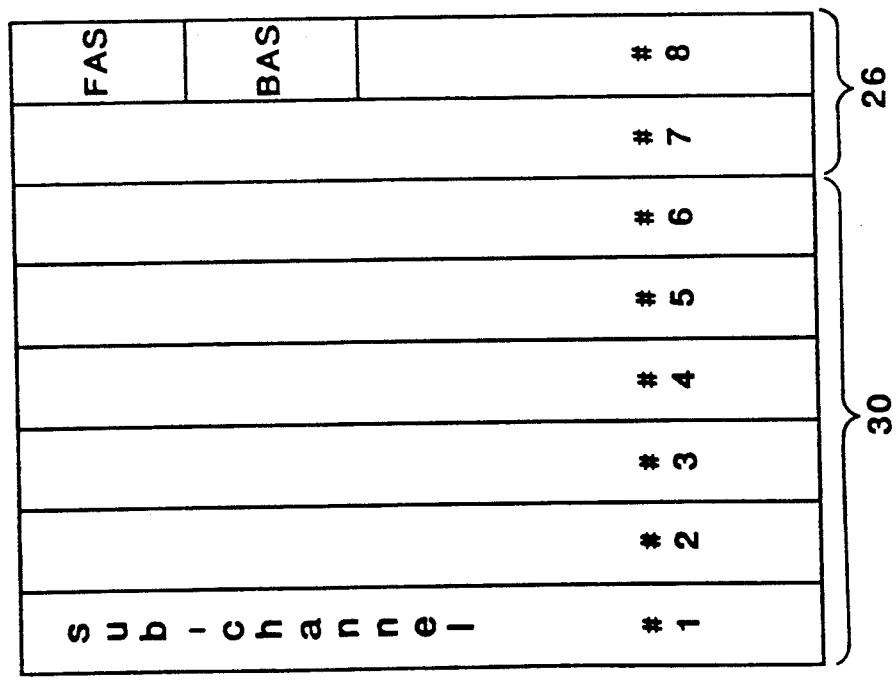

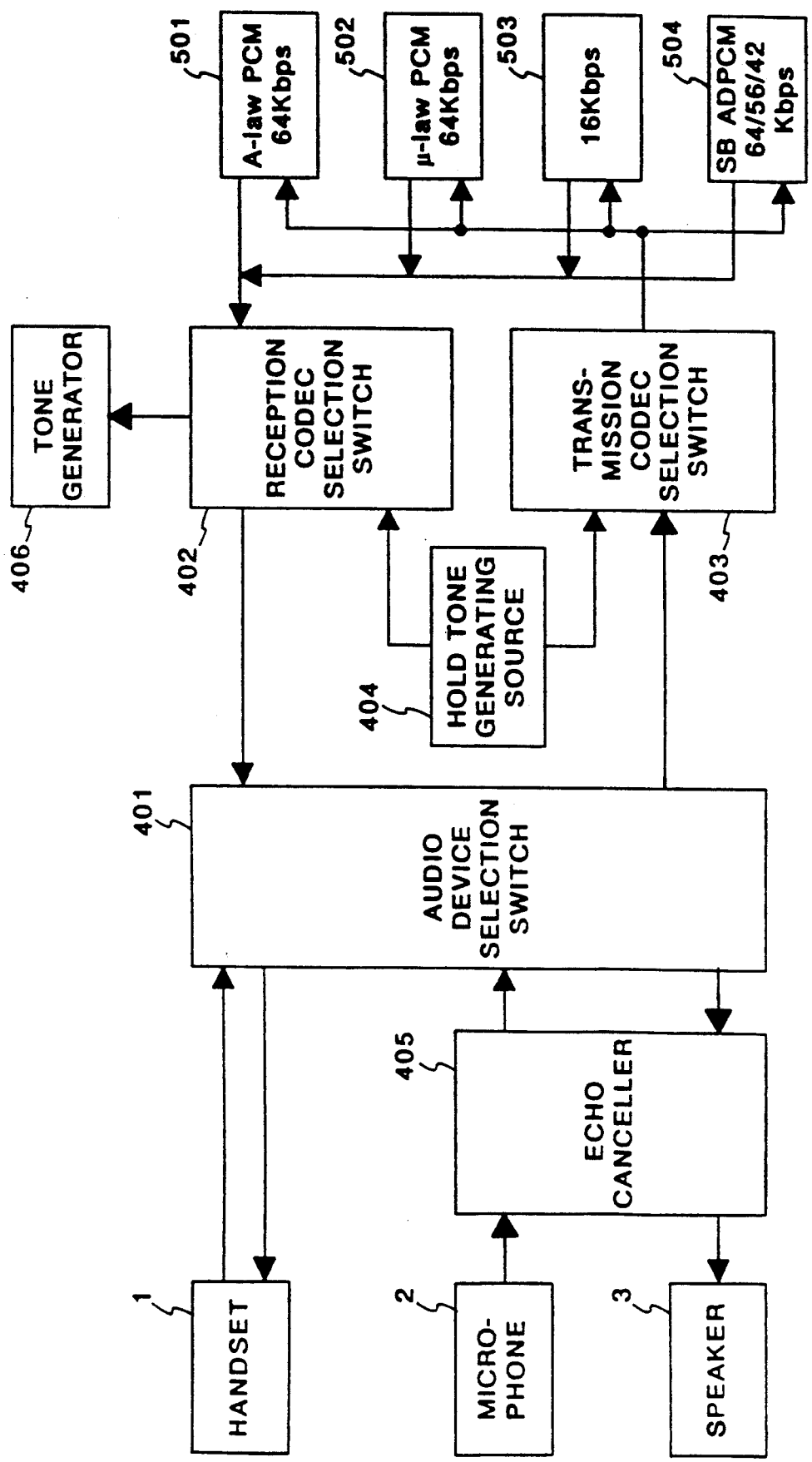
F I G. 12

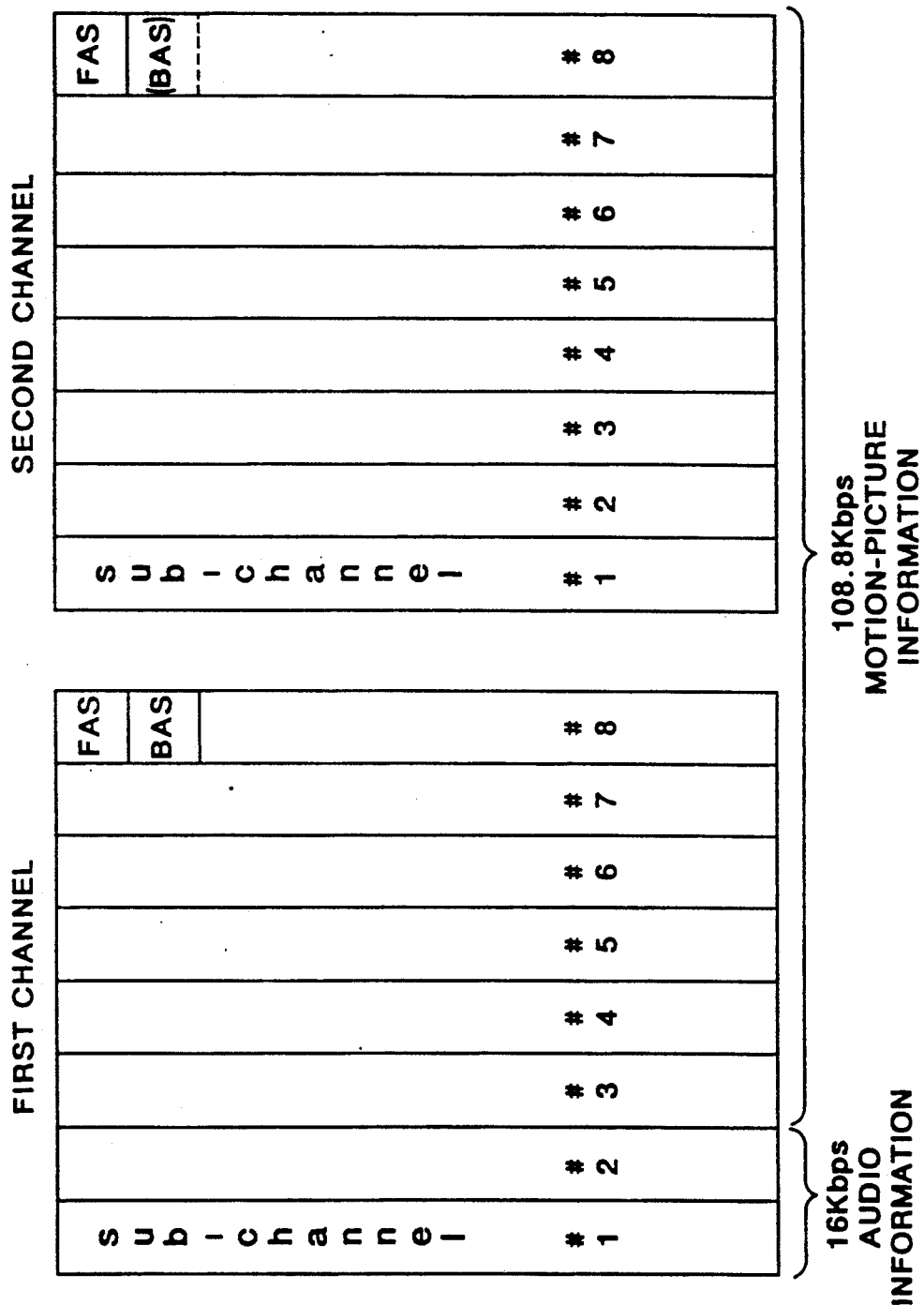
F I G. 14

| MODE / MEDIA | SELECTED MODE STATE |
|---|---|
| AUDIO INFORMATION | 16Kbps |
| TRANSFER RATE | 2B |
| LOW-SPEED DATA | NONE |
| (MOTION PICTURE) | CIF, 2x1/29.97, 108.8Kbps |

F I G. 15

| CAPABILITY / MEDIA | SELECTABLE CAPABILITY |
|---|---|
| AUDIO INFORMATION | 64Kbps A-law, μ-law 16bps, G.725 TYPE 1, TYPE 2 |
| TRANSFER RATE | 2B - - - - |
| LOW-SPEED DATA | 9,600bps - - - - |
| HIGH-SPEED DATA | NONE |
| VIDEO CAPABILITY | CIF & QCIF - - - - 2x1/29.97 SEC. |

F I G. 16

5,301,191

ADAPTIVE SWITCHING OF MULTIMEDIA AUDIO AND VIDEO INFORMATION IN AN ISDN LINE

BACKGROUND OF THE INVENTION

1. Field of the Invention

This invention relates to a multimedia communication apparatus, which is typified by an AV (audiovisual) communication apparatus such as a visual telephone or television conference system, that is capable of multiplexed intercommunication of such multimedia information as audio information, video information and code-data information.

2. Description of the Prior Art

Communication services using ISDN lines have recently started to be put into practical use, and AV (audio-visual) services such as visual telephones and television conference systems employing such digital lines have become the focus of much interest. Service stipulations, protocol stipulations, and multimedia multiplexed-frame structure stipulations for AV services have been announced as CCITT recommendations and recommendation drafts H.320, H.242, H.221.

In H.221, the frame structure in AV services on a 64~1920 kbps channel is stipulated.

FIG. 1 illustrates the H.221 frame structure on the B channel of an ISDN, in which the horizontal axis indicates the bit number and the longitudinal axis the octet number. Eighty octets construct one frame. Control of frame alignment and multiframe alignment, monitoring of communication quality and control of alarm information notification are performed by a FAS (frame alignment signal) shown in FIG. 1.

FIG. 2 illustrates the bit assignment in one multiframe, which is equal to eight sub-multiframes, of the FAS (one sub-multiframe=two frames).

In FIG. 3, designation of the capability of a terminal and the bit allocation for every medium in an actual frame, as well as various other types of control and notification operations are performed by a BAS (bit allocation signal). As shown in FIG. 3, the BAS is transmitted by even-numbered frames. The corresponding error correcting bits are transmitted by odd-numbered frames.

In H.242, communication procedure such as a performance-information exchange sequence and mode changeover sequence using the BAS on the in-channel between AV terminals is stipulated. In H.320, the overall system aspects of AV services are stipulated.

Also, in intercommunication based upon multiconnections utilizing a plurality of B and H channels, frame alignment and multiframe alignment during an additional connection utilizing the FAS, as well as an alignment establishing procedure with respect to a first connection are stipulated.

When multimedia communication of video, audio and data (all user information with the exception of video and audio), etc., is performed in accordance with the above-mentioned recommendations and recommendation drafts, the information transmission speeds of the media are decided as follows: the transmission speed of the audio information is decided by designating the audio operation mode, and the transmission speed of the data information is basically decided by designating the data mode. That which remains, upon subtracting the transmission speeds of the audio information and data information from the capacity of the communication line effective in intercommunication, is the transmission speed of the video information.

Accordingly, the transmission speed of the video information cannot be designated in a definite manner and varies depending upon the designations regarding the other media. Furthermore, in a case where only a very slow speed has been allocated as the transmission speed of the video information, it is recommended that transmission of the video information be halted. However, there are no definite stipulations regarding this.

Nevertheless, in the prior art described above, the result of subtracting the transmission speeds of such media as the audio information and data information from the total transmission speed is merely allocated automatically as the transmission speed of the video information, and therefore a drawback is that the user cannot determine whether the transmission speed of the video information is adequate for transmission of the video information. This may be considered to hold true similarly in a case where the transmission speed allocated to video information becomes inadequate when utilized connections are reduced owing to the occurrence of a connection malfunction at such time that a plurality of channels are being utilized. Though the video codec is capable of sending and receiving video information even at such very low transmission speeds, the video which is monitored takes on a highly unnatural appearance.

For these reasons, consideration has been given to a method in which transmission of the video information is simply turned off when the transmission speed of the video information falls below a stipulated value, as recommended in the above-mentioned recommendation draft of the CCITT. In such a case, however, a disadvantage is that the user cannot recognize that the transmission of the video information has been turned off. A further drawback is that when the transmission of the video information has been turned off, the transmission capacity of the line is wasted.

In a visual telephone wherein intercommunication is performed by multiplexing audio information and video information, etc., using a plurality of connections, the transmission rate allocated to the audio information is not constant owing to times when a hold designation is made. In addition, there are cases where the video information and data information is transmitted on separate connections at the same time that the audio information is transmitted.

Continuing to transmit video, when such transmission on separate connections is maintained when a hold is in effect, is wasteful of the line tariff. Furthermore, with regard also to the holding tone that is transmitted during hold, if, say, 16 kbps has been allocated as the present audio information regardless of the fact that it is unnecessary to transmit media other than the holding tone when hold is in effect, the holding tone will be transmitted in a very low-quality audio band of 16 kbps.

SUMMARY OF THE INVENTION

An object of the present invention is to provide a multimedia communication apparatus in which it is possible to determine whether the transmission speed of video information is adequate for transmission of video and to recognize that the transmission of video information has been turned off, and in which the transmission capacity of a line will not be wasted, thereby enabling the line to be utilized effectively, even if the transmission of video information has been turned off.

According to the present invention, the foregoing object is attained by providing a multimedia communication apparatus for multiplexed intercommunication of a plurality of items of media information such as audio information, video information, code-data information and control information via a communication line, comprising means for coding and decoding the audio information at a designated transmission speed, means for transmitting and receiving the code-data information at a designated transmission speed, means for coding and decoding the video information at a transmission speed which corresponds to the difference between a maximum transmission speed at which communication is possible via the communication line and a total transmission speed allocated to media information other than the video information, means for providing an indication of the fact that the transmission speed which corresponds to the difference is inadequate for transmission of the video information if this transmission speed is less than a predetermined value, means for suspending transmission of the video information if the speed which corresponds to the difference is less than the predetermined value, means for providing an indication of the fact that transmission of the video information has been suspended, and means for allocating the transmission speed which corresponds to the difference to the transmission and reception of information other than the video information.

Another object of the present invention is to provide a multimedia communication apparatus in which it is possible to prevent the occurrence of extra line tariffs caused when a needless connection is maintained in the connected state while hold is in effect, and in which it is possible to prevent an unusual noise from being sent to the other party as the result of transmitting a meaninglessly low-quality holding tone to the other party.

A further object of the present invention is to provide a multimedia communication apparatus in which connections necessary for recovery of communication are assured also during hold and transmission modes such as multiplexed allocation which prevailed prior to the hold are stored in memory, whereby the communication state is promptly restored by a hold-release designation to the mode which prevailed prior to hold.

According to the present invention, the foregoing objects are attained by providing a multimedia communication apparatus for multiplexed intercommunication of a plurality of items of media information such as audio information, video information, code-data information and control information via a communication line, comprising means for coding and decoding the audio information at a designated transmission speed, means for transmitting and receiving the code-data information at a designated transmission speed, means for multiplexing the plural items of media information in information-frame units in conformity with the information transfer rate of each item of media information, means for separating the received plural items of media information, which have been multiplexed in information-frame units, according to each item of media information, first control means for establishing a plurality of connections and controlling transmission and reception of the multiplexed plural items of media information via the plurality of connections, second control means for allocating a single connection among the plurality of connections to transmission of the audio information in response to a communication-hold designation made via the plurality of connections, means for disconnecting all connections except for the single connection allocated from the plurality of connections by the second control means, and means for resetting the disconnected connections based upon a disconnect designation with respect to the hold.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram showing the bit assignments between frames of an FAS;

FIG. 3 is a diagram showing the frame structure of a BAS;

FIGS. 5(a)-(b), 6(a)-(b), 7(a)-(b), 8(a)-(b) are diagrams showing examples of multiplexing of multimedia to CCITT H.221;

FIG. 12 is a block diagram showing the construction of an audio-control interface constituting a multimedia communication apparatus according to a second embodiment of the present invention;

FIG. 14 is a diagram showing an example of multiplexing using two lines of an ISDN;

FIG. 15 is a diagram showing an example of a communication mode in the second embodiment;

FIG. 16 is a diagram showing an example of selectable communication capability in the second embodiment.

DESCRIPTION OF THE PREFERRED EMBODIMENTS

Embodiments of the present invention will now be described in detail with reference to the accompanying drawings.

First Embodiment

Figure 1:
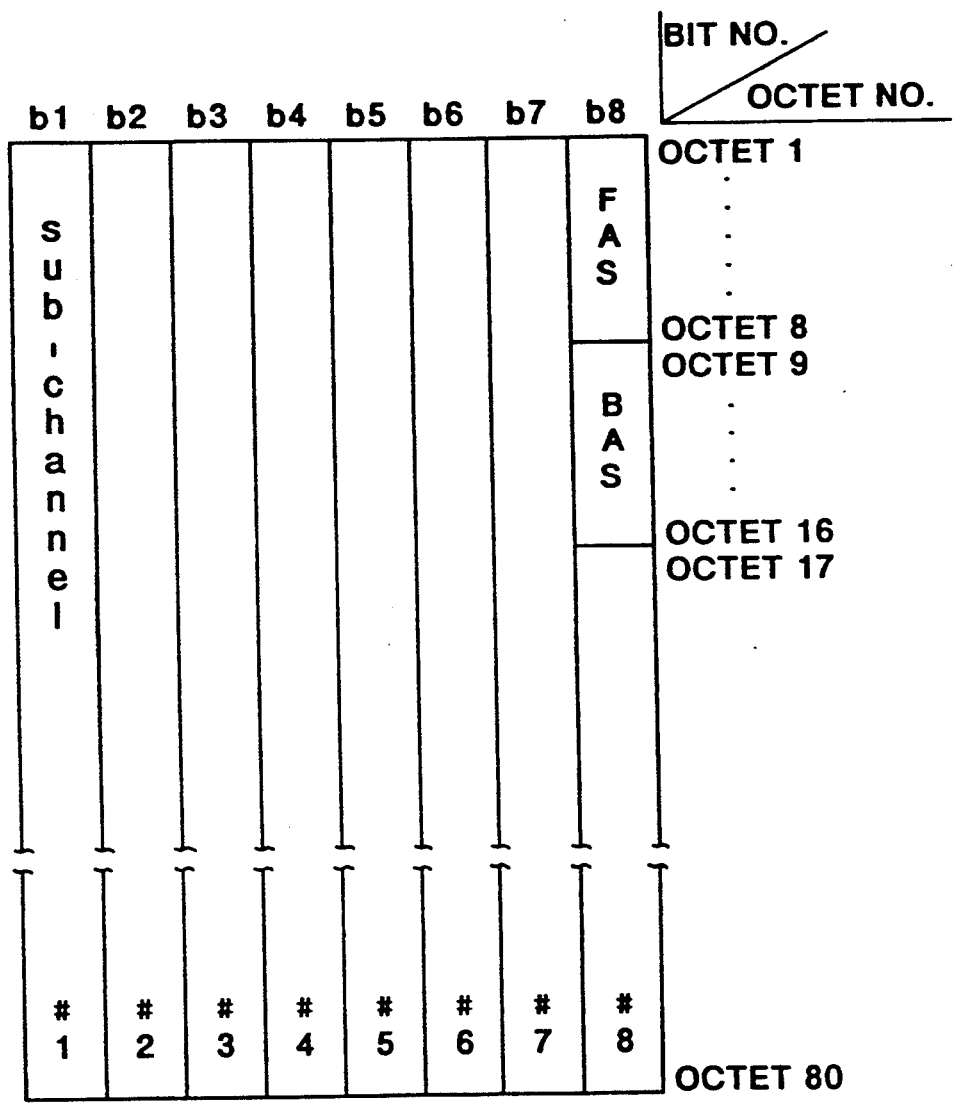
FIG. 1 is a diagram showing frame structure according to CCITT H.221 on the B channel of an ISDN.
Figure 4:
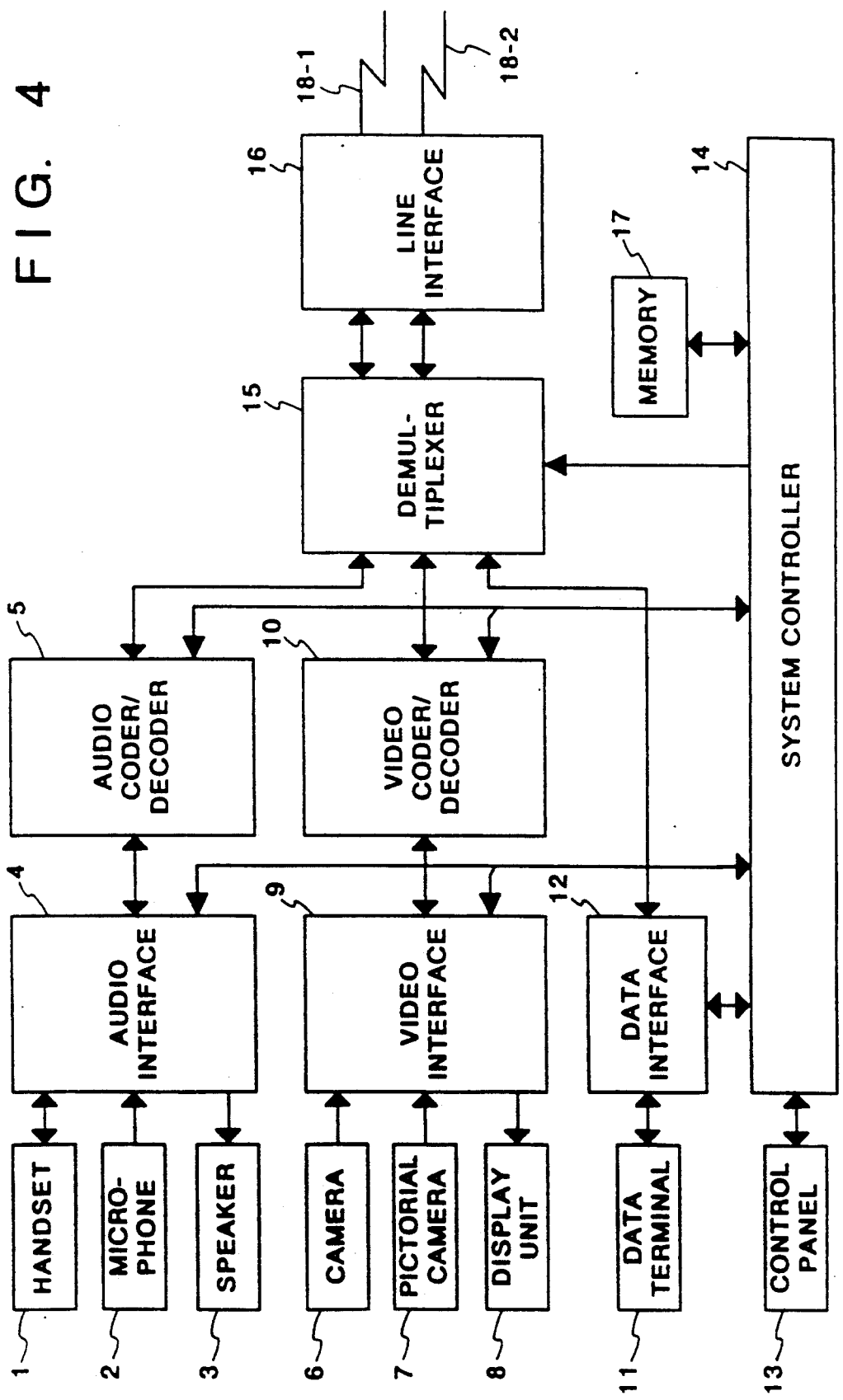
FIG. 4 is a block diagram showing the construction of a communication apparatus according to a first embodiment of the present invention.

FIG. 4 is a block diagram illustrating the construction of a communication apparatus according to a first embodiment of the present invention.

As shown in FIG. 4, the communication apparatus includes a handset 1 which is one of the audio input/output means of the communication apparatus, a microphone 2 which is one of the audio input means, a speaker 3 serving as one of the audio output means, and an audio interface 4 which, under the control of a system controller 14, executes changeover processing for changing over the handset 1, microphone 2 and speaker 3 serving as the audio input/output means, on/off-hook detection processing for detecting whether the handset 1 is on the hook or off the hook, echo-cancellation processing for eliminating echo which occurs when the microphone 2 and speaker 3 are used simultaneously as audio input/output means, and tone-generation processing for generating a dial tone, a ring-back tone, a busy tone and an incoming tone, etc.

The apparatus further includes an audio coder/decoder 5 which, in accordance with 64 Kbps PCM A-law, 64 Kbps PCM μ-law, 64 Kbps/56 Kbps/48 Kbps SB-ADPCM, 32 Kbps ADPCM, 16 Kbps (e.g., APC-AB), 8 Kbps audio signal coding/decoding algorithms, codes transmission audio signals and decodes reception audio signals in response to a designation from the system controller 14. Also provided are a camera 6, which serves as one of the image input means, for inputting one's own image, a pictorial camera 7, which serves as one of the image input means, for inputting pictures and the like, and a display unit 8 for displaying input images from the camera 6 or 7, a received image from another party, and screen images for operating the apparatus.

A video interface 9 is responsive to a designation from the system controller 14 to perform processing for changing over the image input means, processing for changing over among the display of the input image, the display of the received image and the display of the operations screen, and processing for combining image signals in order to display these various images on the display unit 8 in time-shared fashion. A video coder/decoder 10 codes transmitted images and decodes received-image signals in accordance with CCITT recommendation draft H.261. Numeral 11 denotes a data terminal for performing data transmission, and 12 a data interface for communicating transmission data from the data terminal 11 and system controller 14 to a demultiplexer 15 and communicating received data to the data terminal 11 or system controller 14.

A control panel 13 constituted by a keyboard, touch panel or the like is used to input control information for performing overall control of the communication apparatus according to this embodiment. The system controller 14, which includes a CPU, a ROM 17, a RAM and an auxiliary memory device, monitors the states of the various components and controls the overall apparatus, produces operation/display screens which conform to the prevailing state, and executes application programs, etc.

The demultiplexer 15, in accordance with CCITT recommendation H.221, multiplexes the audio signal from the audio coder/decoder 5, the image signal from the video coder/decoder 10, the data from the data interface 12, and the BAS from the system controller 14 in transmission frame units and separates a received frame into each medium of the constituent unit and communicates this to each component. A line interface 16 controls the line in accordance with the ISDN user or network interface, and a memory 17 stores the various items of control information and the like.

FIGS. 5 through 8 are diagrams illustrating examples of multiplexing of multimedia to an H.221 frame.

The operation of the communication apparatus according to this embodiment will now be described.

Figures 5A, 5B:
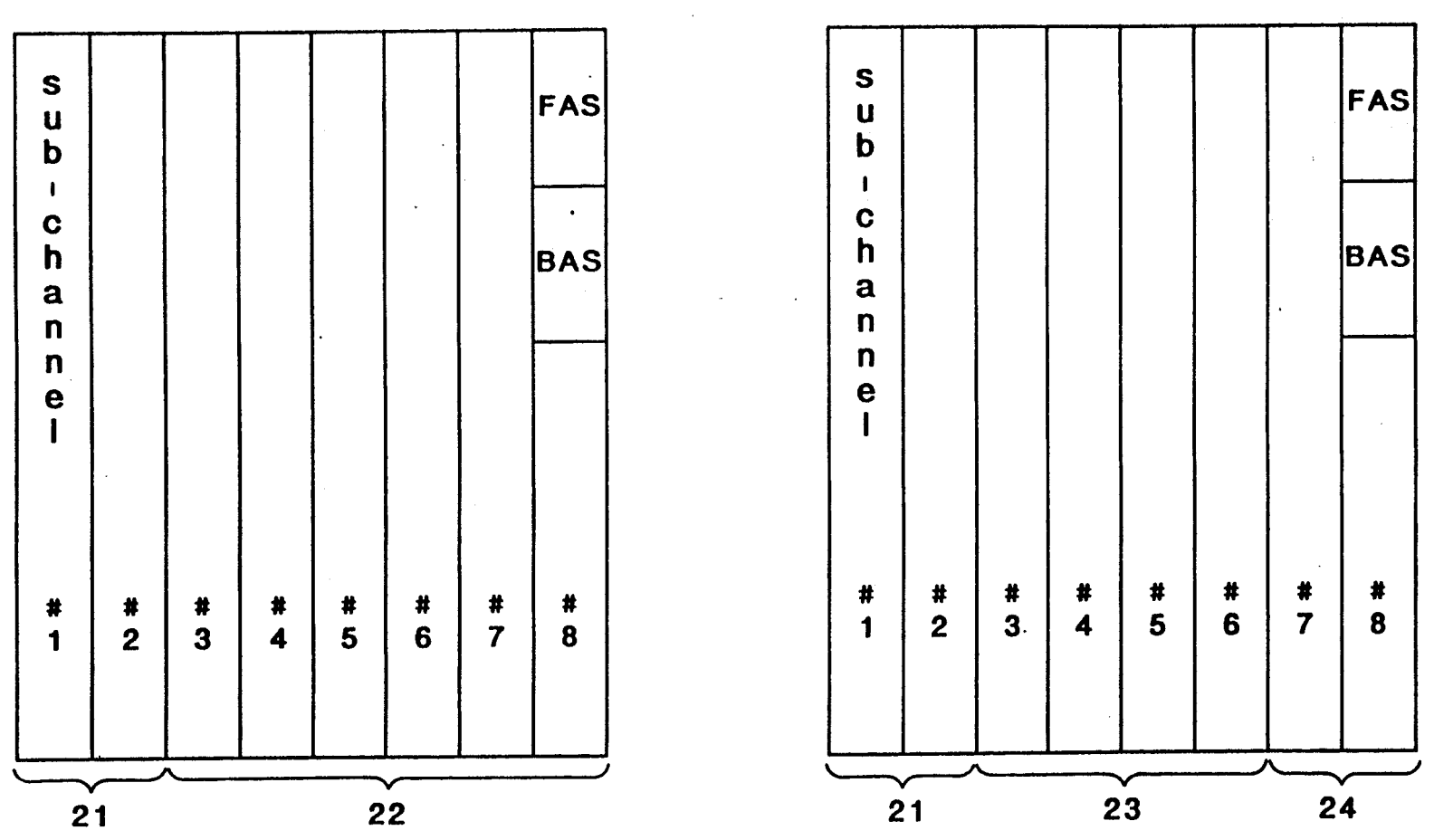
Figure 9:
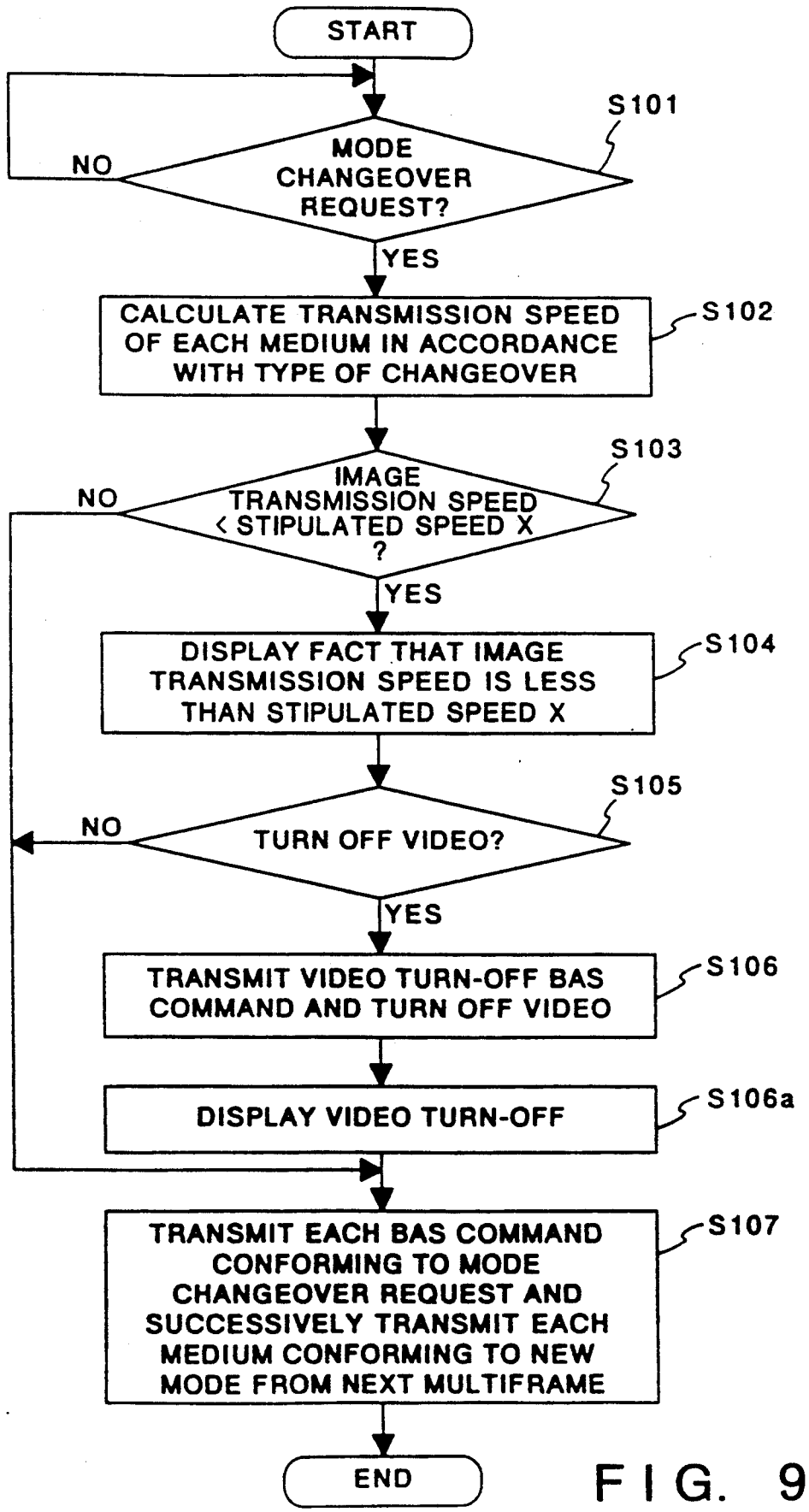
FIG. 9 is a flowchart showing display processing relating to transmission speed in the first embodiment.

First, as shown in FIG. 5(a), it will be assumed that two-way communication of 16 kbps audio information 21 and 46.4 kbps motion-picture information 22 is being performed on 64 kbps × 1 channel of the communication apparatus. Reference will be had to the flowchart of FIG. 9 to describe processing through which the user is informed via display of the fact that the transmission speed of the image information has fallen below a certain stipulated value.

First, at step S101, the system waits for a mode changeover request for changing the current communication mode. When the mode changeover request has been sensed at step S101, the program proceeds to step S102, at which the type of changeover is discriminated, the multiplexing of each of the media is decided, and a transmission speed allocatable to the image information is calculated. If the mode changeover request is a data information 14.4 kbps addition request, the transmission speed allocatable to a motion picture (video) at this time will be 32 kbps.

The above-mentioned transmission speed and a stipulated value X that has been stipulated in advance are compared at step S103. The stipulated value may be about 40 kbps, as recommended in the CCITT recommendation draft, or it may be decided by a value based upon the capability of an image codec i.e., (of the video coder/decoder 10). By way of example, if the video codec is such that it is capable of sufficiently handling transmitted video up to 30 kbps, then the stipulated value is made to be 30 kbps.

When the transmission speed allocatable to video is less than the stipulated value X, the program proceeds to step S104. Here, an indication that the transmission speed allocatable to video is less than stipulated value X is displayed on the display unit 8 to alert the user.

Next, at step S105, it is determined, based upon a flag/parameter selected in advance, whether transmission of the video should be turned off. When it is decided that the transmission of video should be turned off, the program proceeds to step S106, at which a video-off BAS command is transmitted to inform the other party's apparatus. In addition, transmission of the video is turned off. The fact that transmission of video information has been turned off is displayed on the display unit at step S106a.

Finally, at step S107, each BAS command conforming to the contents of the mode changeover request is transmitted and transmission of each medium conforming to the new mode starts successively from the next multiframe. Here, since data information of 14.4 kbps is merely to be added, it will suffice merely to add a BAS command of low-speed data information of 14.4 kbps in accordance with CCITT recommendation H.221. Furthermore, when the transmission speed allocatable to video is found to be equal to or greater than the stipulated value X at step S103, or when the setting examined at step S105 is such that the video has not been turned off, the program proceeds to step S107, at which time processing described above is executed.

Figures 6A, 6B:
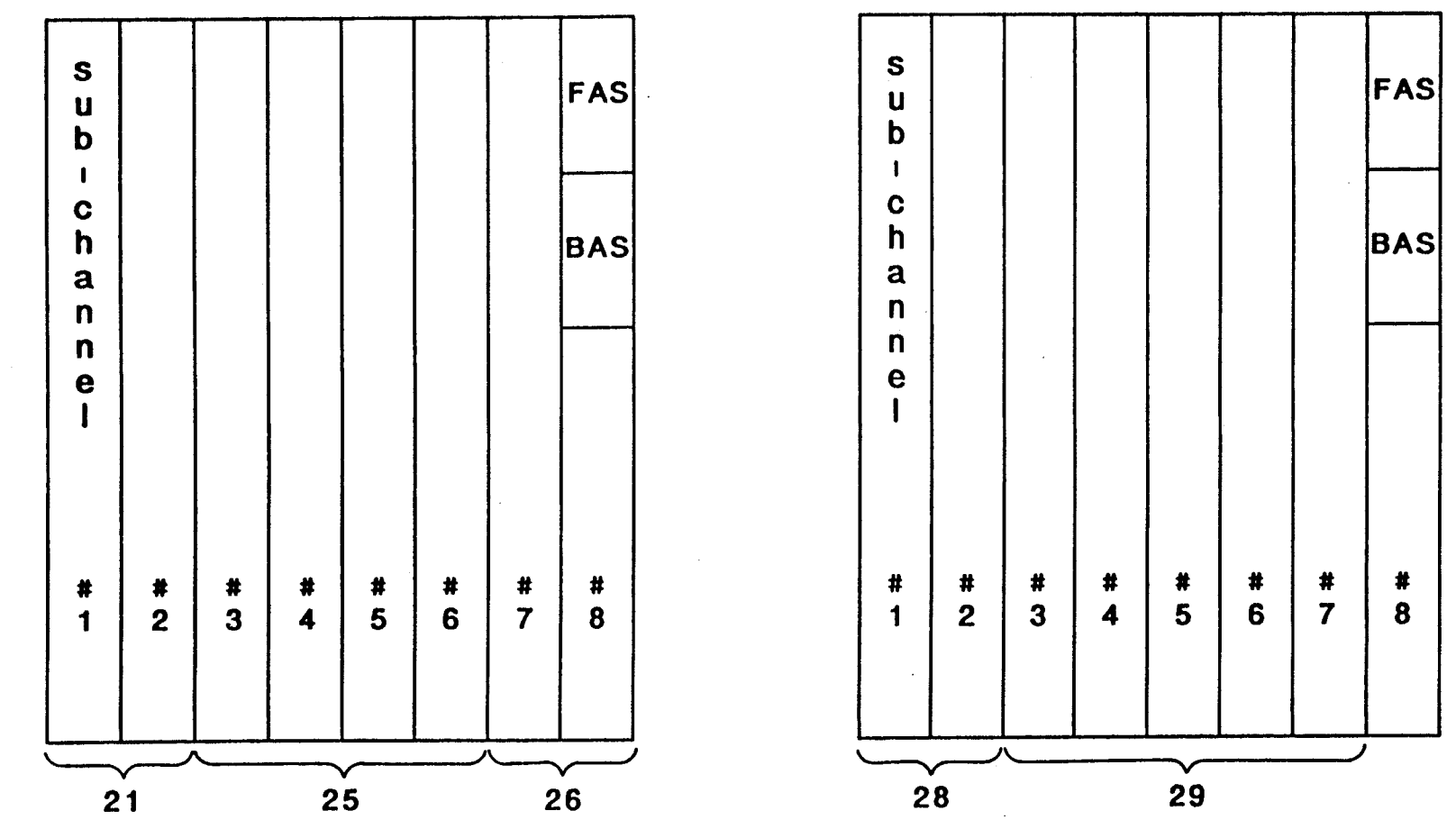

When the setting is such that the video is turned off at such time that the stipulated value X is higher than 32 kbps and the transmission speed allocatable to video is less than the stipulated value X, the media constitution within the frame of CCITT recommendation H.221 is as shown in FIG. 6(a). The media constitution at other times is as shown in FIG. 5(b), where 32 kbps motion-picture information continues to be transmitted. In FIGS. 5(b) and 6(a), numeral 21 denotes 16 kbps audio information the same as in FIG. 5(a), numeral 23 denotes 32 kbps motion-picture information, and numerals 24, 25 and 26 designate 14.4 kbps data information, the absence of information and 14.4 kbps data information, respectively.

Figure 10A:
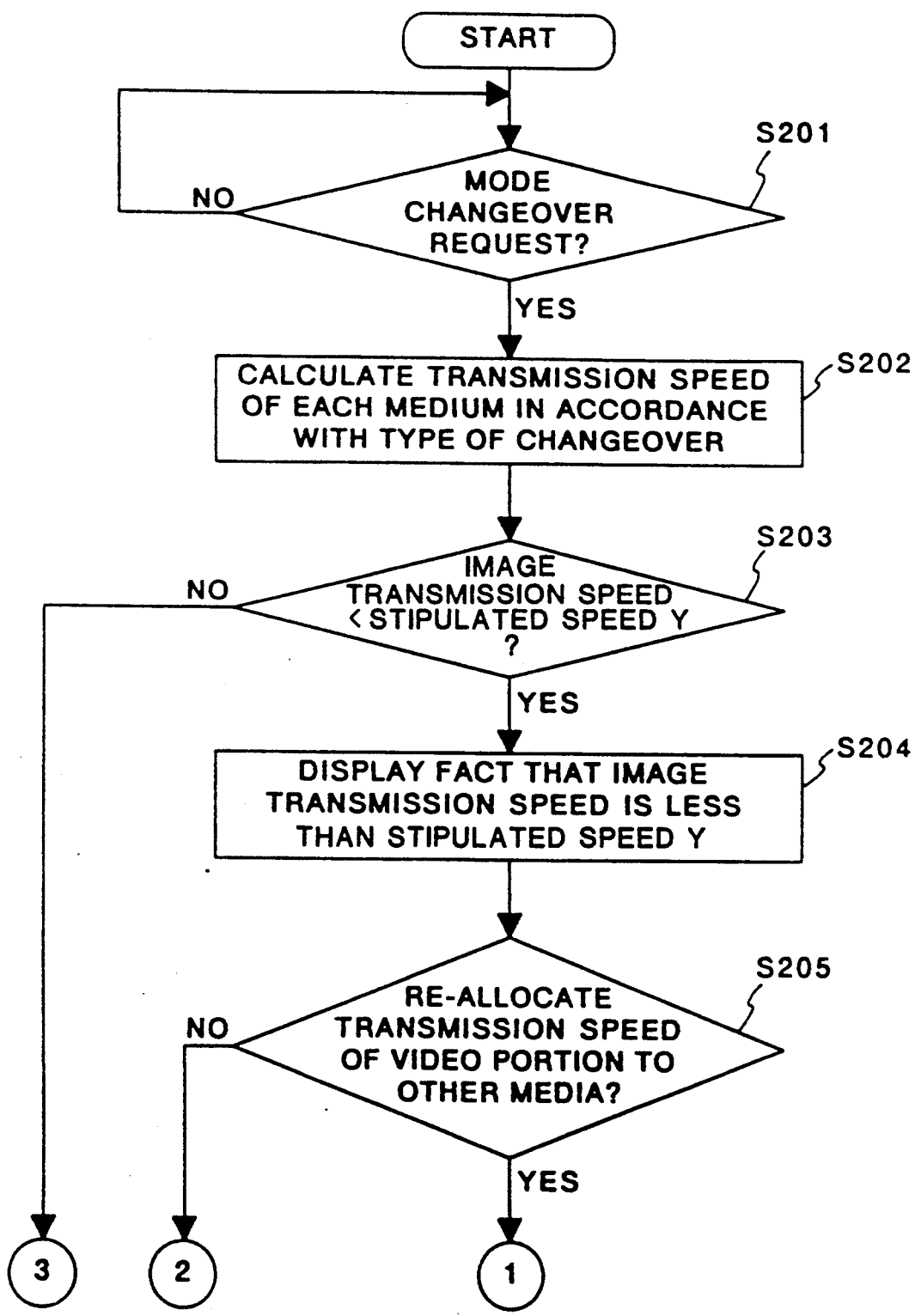
FIGS. 10(a)-(b) is a flowchart showing allocation processing for information multiplexing in the first embodiment.
Figure 10B:
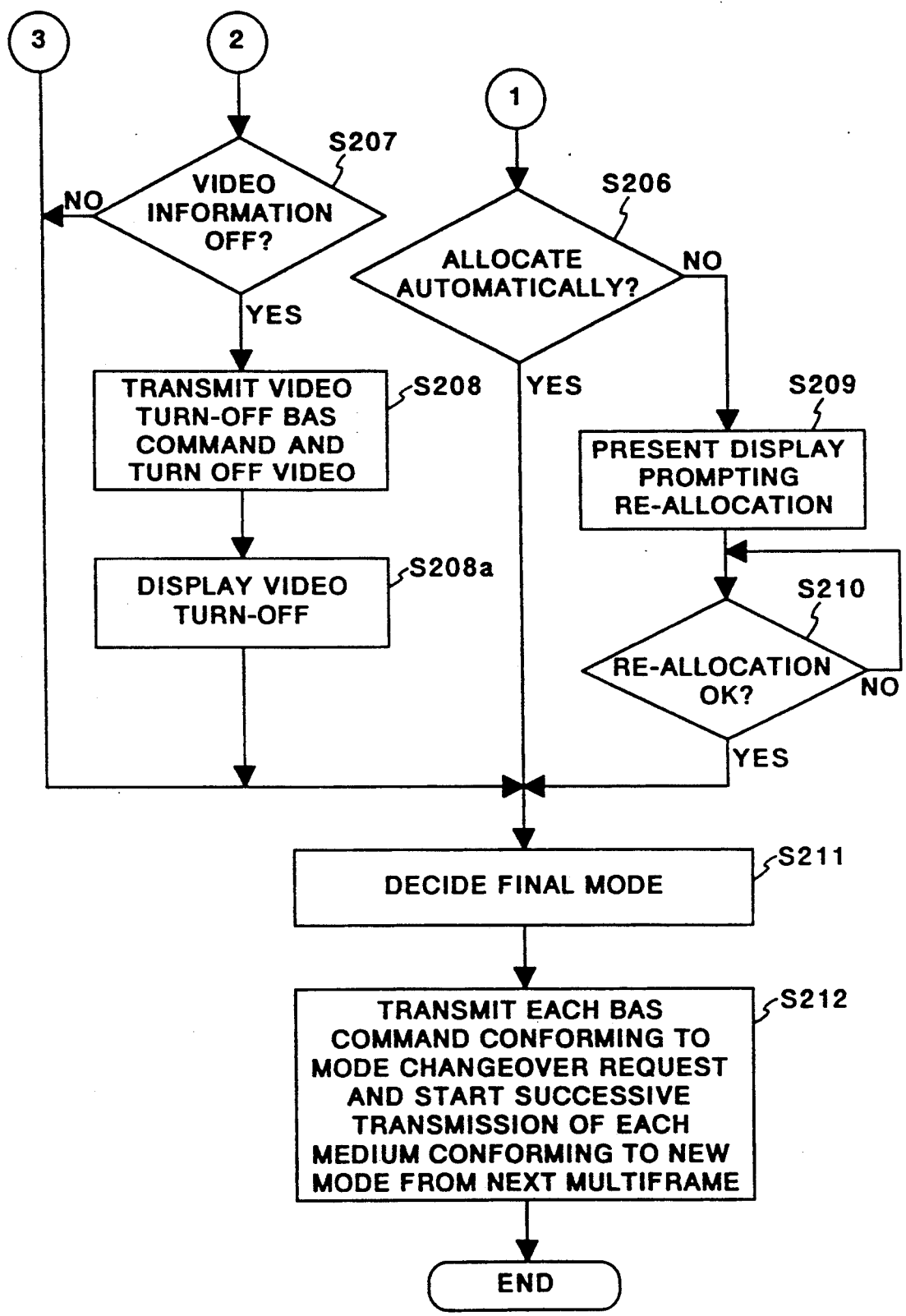

Reference will now be had to the flowchart of FIG. 10 to describe processing for re-allocating multiplexing to other media when the transmission speed of the video information is less than the stipulated value.

The processing of steps S201, S202, S203 and S204 is the same as that of steps S101, S102, S103 and S104 described above. When the decision rendered at step S203 is that the transmission speed allocatable to video is less than a stipulated value Y, a display is presented at step S204 to inform the user of that fact, and then it is determined at step S205, based upon a flag/parameter set in advance, whether the transmission speed should be re-allocated to other media.

When re-allocation has been set, the program proceeds to step S206, at which it is determined, based upon a flag/parameter set in advance, whether re-allocation is to be performed automatically. If the mode set is such that re-allocation is to be performed automatically, then re-allocation of the remaining transmission speed is executed in accordance with an order of priority that has been decided in advance in the multimedia communication apparatus. For example, since the remaining transmission speed is 32 kbps in the present case, it will be possible to raise the transmission speed allocatable to data to, say, 40 kbps if priority is given to early processing of the transmission of requested data.

FIG. 6(b) illustrates the multiplexed constitution of the H.221 frame in the above case. In FIG. 6(b), numeral 28 denotes 16 kbps audio information and 29 represents 40 kbps data information. In a case where the transmission speed for data cannot be raised or a case where raising the transmission speed for data would not be very meaningful, it is possible to give priority to raising audio quality in order to obtain 48 kbps audio information 30, as shown in FIG. 7(a).

Further, as illustrated in FIG. 7(b), it is possible also to allocate both audio and data to a higher mode as a result. In FIG. 7(b), numeral 31 denotes 32 kbps audio information, and numeral 32 designates 24 kbps data information.

If the result of the decision at step S206 is YES, then the program proceeds to step S211.

When it is decided at step S206 that the mode is not that for performing re-allocation automatically, a display inquiring as to whether re-allocation should be made is presented at step S209, and the system waits for a designation from the user at step S210. When the user has finished making a designation at step S210 as to which medium is to receive re-allocation, the program proceeds to step S211 in accordance with the designation made.

When it has been decided at step S205 that the mode is such that re-allocation is not performed, the program proceeds to step S207, at which it is determined whether the prevailing mode is one in which video is to be turned off. If the mode set is this mode, then the BAS command for video turn-off is transmitted to inform the other party's apparatus, and transmission of video is turned off at step S208. Next, at step S208a, the fact that transmission of video information has been turned off is displayed on the display unit 8 and the program proceeds to step S211.

At step S211, the final multiplexed configuration is decided on the basis of the processing steps that have been executed. Finally, at step S212, the transmission of each type of media in the new mode starts in succession from the next multiframe while the BAS commands necessary for making the transition to the new mode are transmitted.

Figure 11A:
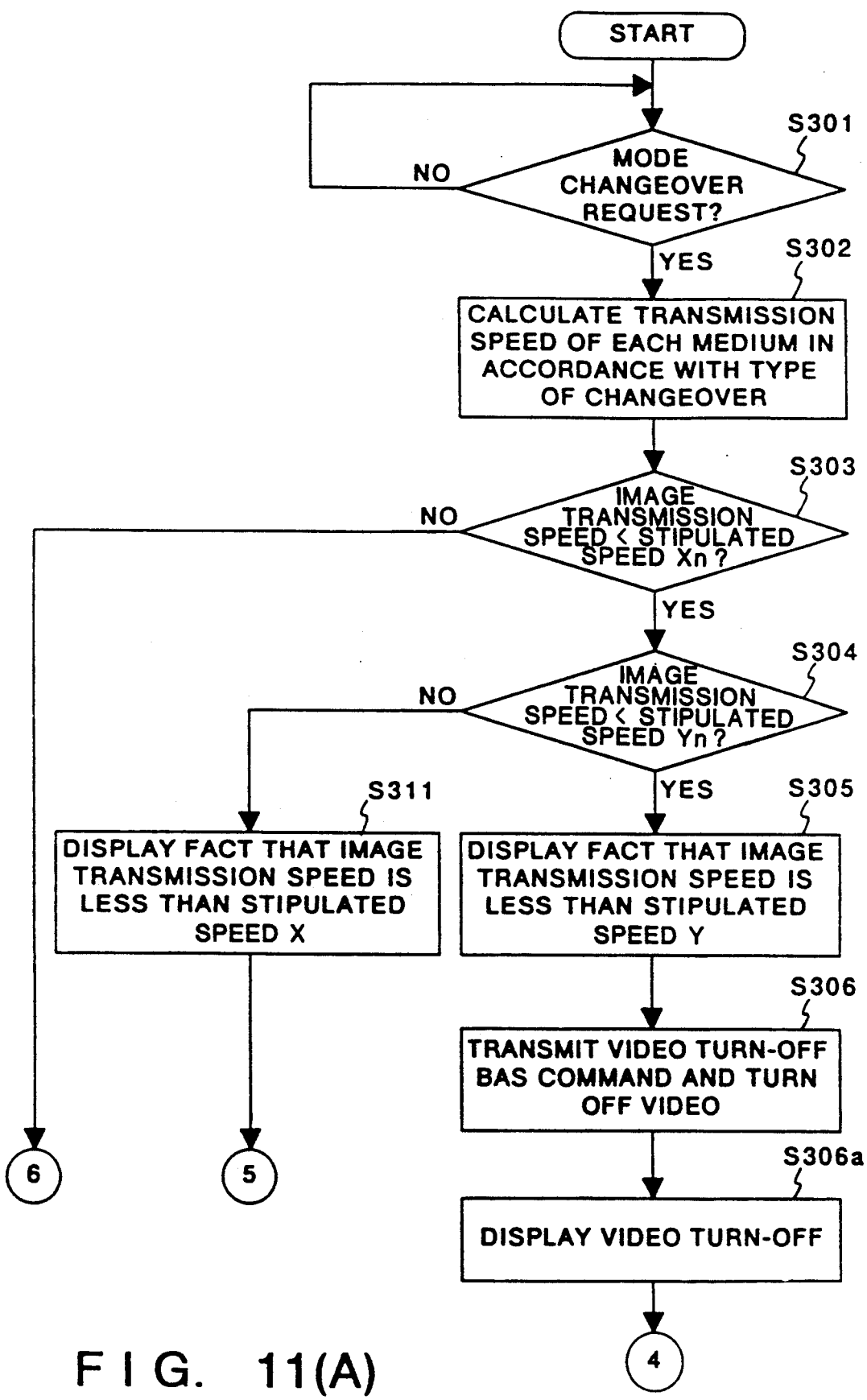
FIGS. 11(a)-(b) is a flowchart showing re-allocation processing for information multiplexing in the first embodiment.
Figure 11B:
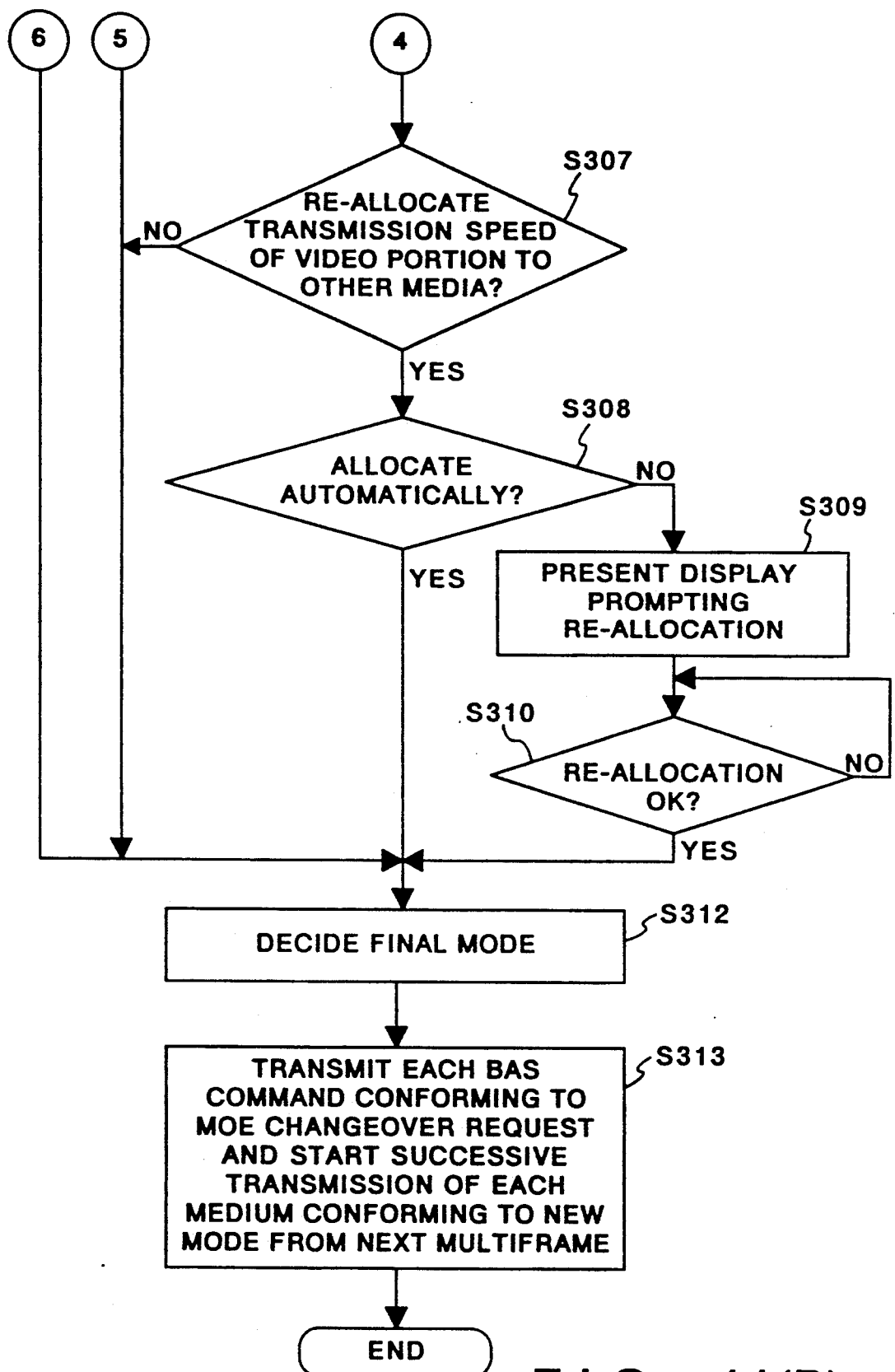

Reference will now be had to the flowchart of FIG. 11 to describe a case in which re-allocation processing is performed by a two-step decision regarding stipulated values $X_n$, $Y_n$. Steps S301 and S302 are the same as steps S101 and S102 in FIG. 9.

The video transmission speed and the stipulated value $X_n$ are compared at step S303. This stipulated value is a value which determines whether the user is informed of the fact that the video transmission speed is low. When the video transmission speed is less than $X_n$, the second stipulated value $Y_n$ and the video transmission speed are compared at step S304. This stipulated value is for deciding whether transmission of video is to be turned off.

In a case where a transmission speed higher than $Y_n$ has been allocated, the program proceeds to step S311, at which the fact that the video transmission speed has become very low is displayed, and then to step S312. In a case where only a transmission speed lower than $Y_n$ can be allocated, the program proceeds to step S305, at which a display to the effect that a transmission speed for transmitting video could not be allocated is presented on the display unit 8, and then to step S306. Here a BAS command for video turn-off is transmitted to inform the other party's apparatus, and transmission of video is turned off. Next, at step S306a, the fact that transmission of video information has been turned off is displayed on the display unit 8.

It is then determined at step S307 whether the mode is one for allocating the remaining transmission speed to another type of media. When the answer is YES, the program proceeds to step S308. It should be noted that the processing of steps S308, S309 and S310 is the same as that of steps S206, S209 and S210 shown in FIG. 10. As a result, transmission based upon the finally decided mode begins, in the same manner as at steps S211, S212 described above, through steps S312, S313.

In the embodiment described above, re-allocation processing is discussed only with regard to a case in which a single channel is used. However, the invention naturally is applicable also when a plurality of channels are used, and the invention is effective not only when a mode is changed in response to a request from the user but also when a line malfunction occurs in a case where a plurality of channels are employed.

Figure 8A:
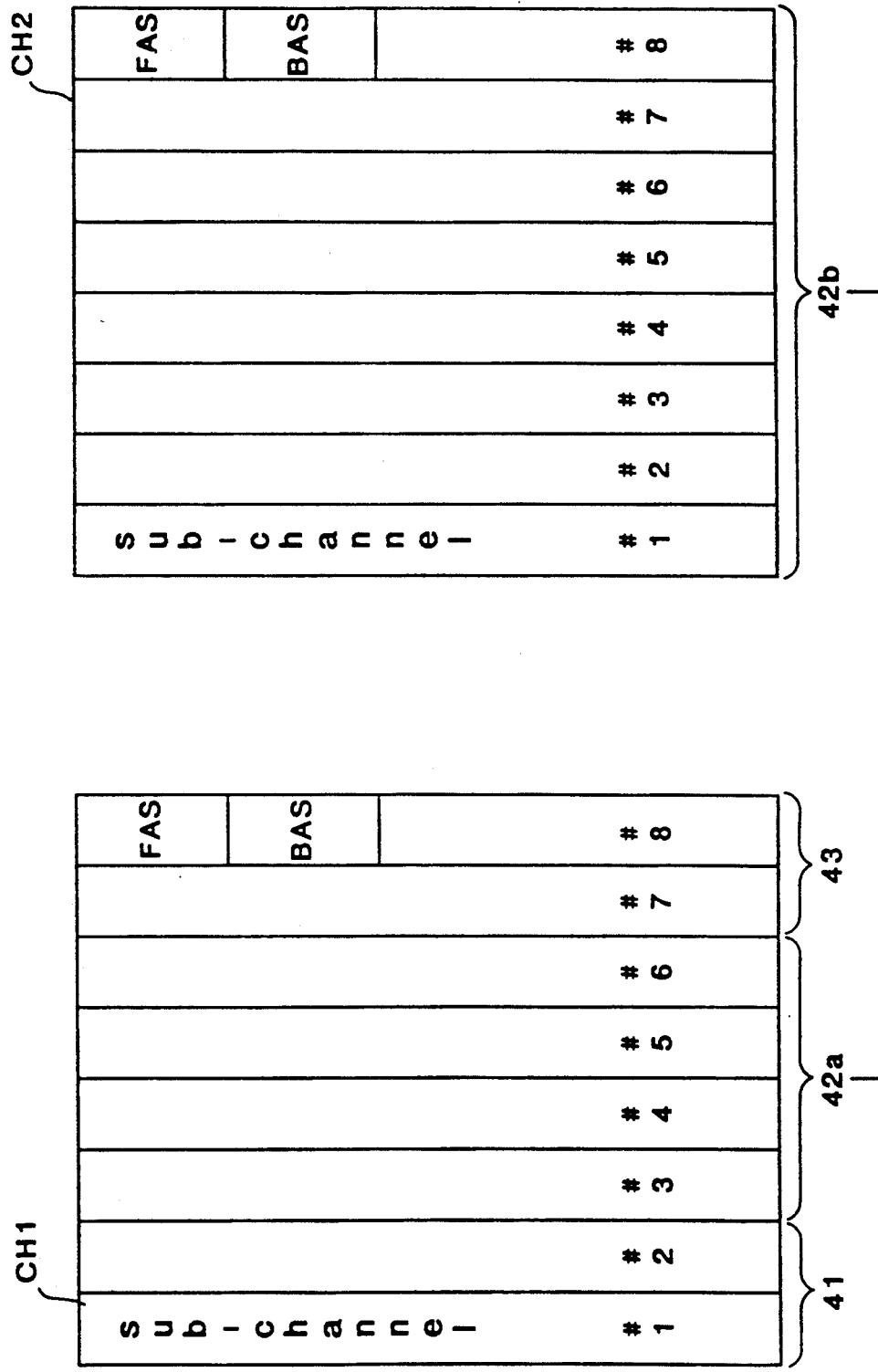
Figure 8B:
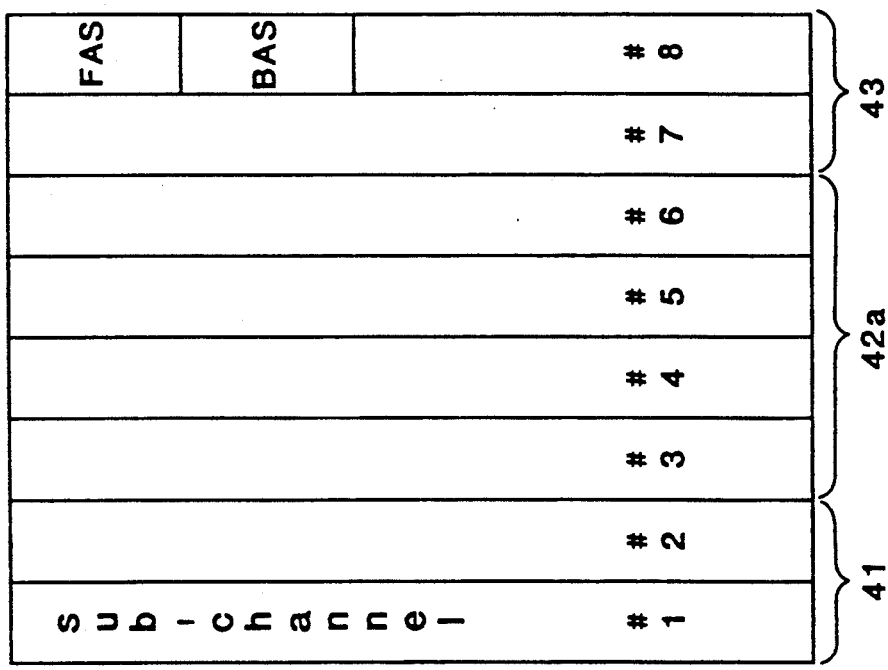

More specifically, assume that two channels CH1, CH2 are used, as in FIG. 8(a), and that intercommunication is performed with 16 kbps audio information 41, 14.4 kbps data information 43 and 94.4 kbps motion-picture information 42a, 42b. If a disconnection occurs for some unknown reason on the side of the second channel CH2, only the first channel CH1 will be usable. When the aforementioned audio and data are allocated to channel CH1, only 32 kbps can be allocated to the motion picture as a result. This is the example of multiplexing shown in FIG. 8(b). At such time, the description given above can be applied to determine how the 32 kbps motion-picture information 42a should be handled.

The foregoing embodiment has been described solely with regard to processing through which the user is informed, by a display presented on his own machine, of the reasons for certain operations. However, if an extended BAS message, D-channel user/user information, etc., is capable of being utilized, then it will be possible to present a display of reasons on the apparatus of the other party.

In the foregoing embodiment, an example has been described in which the mode designation of other media is given priority in line with the stipulation that, in accordance with the CCITT recommendation and recommendation draft, the transmission speed of video information obtained by subtracting the total transmission speed of other media from the total transmission speed of the utilizable communication line. However, in the interface with the user of the multimedia communication apparatus, it is permissible to adopt an arrangement in which processing is so executed that, by designating the transmission speed of the video information in priority fashion, the designation of other media is not allowed in such a manner that the transmission speed will be less than the designated video-information transmission speed.

Thus, as described above, when the transmission speed of video information falls below a certain stipulated value, the user is informed of the fact that the transmission speed that has been allocated to this video information is inadequate, thereby making it possible to attract the user's attention. In addition, the user can promptly be informed of the fact that sufficient video is not being transmitted to the other party.

When the transmission speed of the video information falls below the stipulated value, the transmission of the video information is turned off and the user is informed of such turn-off. This makes it possible to prevent the transmission of poor-quality video and to become aware of the fact that one's own video is not being transmitted to the other party.

Furthermore, by allocating the transmission speed that has been allocated to video information to another type of media such as audio or code-data information, the transmission of poor-quality video can be prevented. In addition, it is possible to prevent the transmission capacity of the line from being wasted, thus allowing the line to be utilized more effectively.

Second Embodiment

A second embodiment of the present invention will now be described. The multimedia communication apparatus of this embodiment is structurally identical with that of the first embodiment set forth above and need not be described again.

FIG. 12 is a block diagram showing the detailed construction of an audio-control interface section constituting the multimedia communication apparatus according to this embodiment. In FIG. 12, numeral 401 denotes an audio device selection switch for performing selection changeover of audio input/output devices, 402 a reception codec selection switch which controls audio codec selection changeover for received audio, and 403 a transmission codec selection switch which controls audio codec selection changeover for transmitted audio. Numeral 404 denotes a hold tone generating source for generating a hold tone on the other party's side and a hold tone on the user's side when a holding state is in effect. Numeral 405 designates an echo cancellation controller for eliminating echo in the microphone and speaker section, and 406 a tone generator for generating a dial tone, a busy tone and a call tone, etc.

Numerals 501, 502, 503 and 504 represent audio codecs for coding/decoding the various types of audio. Specifically, numeral 501 denotes a 64 kbps A-law PCM audio codec, 502 a 64 kbps μ-law PCM audio codec, 503 a 16 kbps audio codec, and 504 a 7 KHz SB-ADPCM audio codec for accommodating 64/56/48 kbps.

Figure 13:
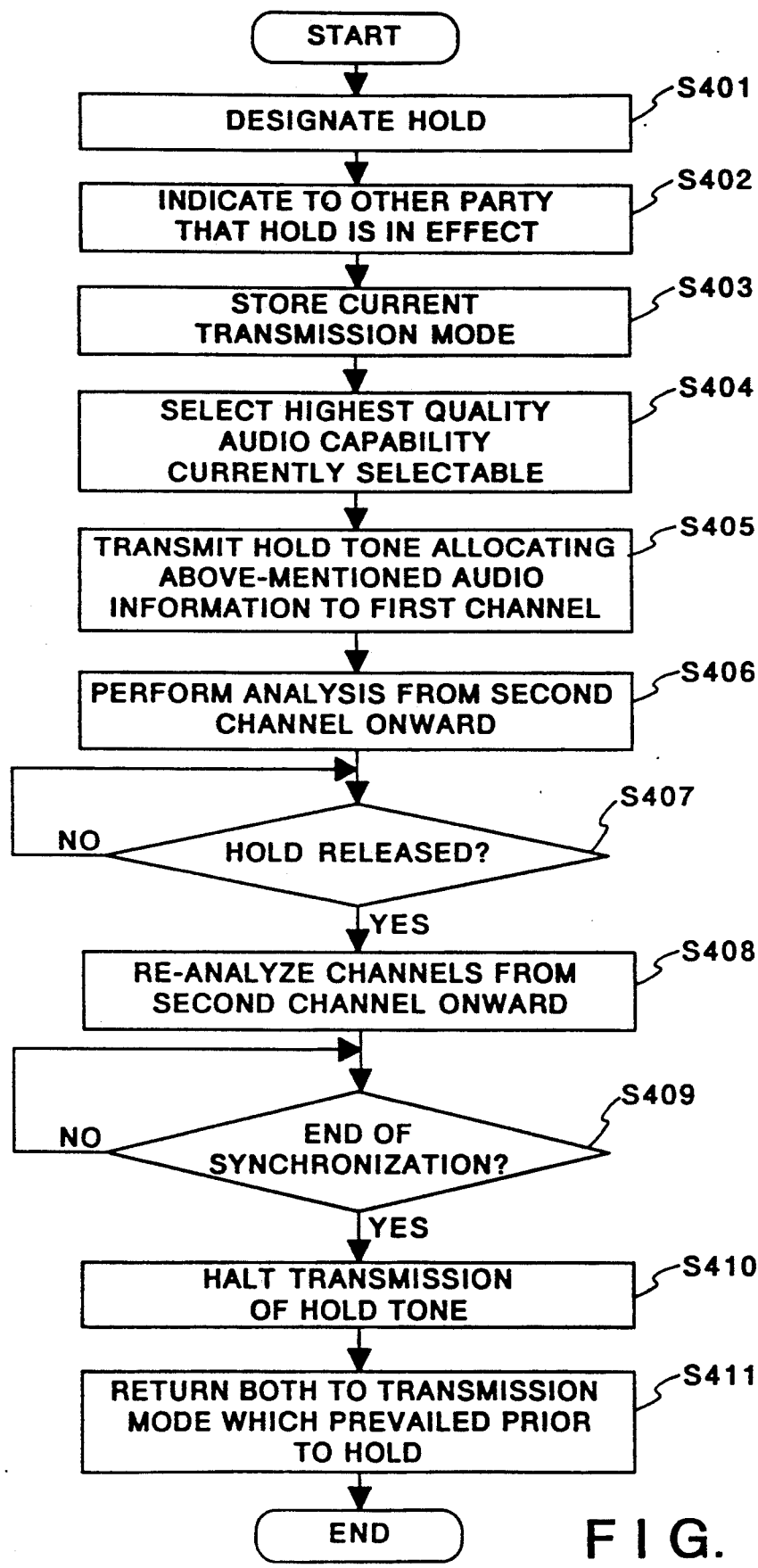
FIG. 13 is a flowchart showing operation at the time of a hold-designation input in the second embodiment.

Reference will be had to the flowchart of FIG. 13 to describe operation when a hold designating input is made during communication in the multimedia communication apparatus according to the embodiment having the construction described above. This operation is a feature characteristic of this apparatus.

In order to simplify the description, two B channel lines of an ISDN are used in this multimedia communication apparatus, as illustrated in FIG. 14, and multiplexed communication is performed adopting 16 kbps in the first channel for the audio information and a total of 108.8 kbps of the remainder of the first channel and the second channel for the motion-picture information.

In step S401 of the flowchart of FIG. 13, an input designating a hold is entered from the control panel 13 (see FIG. 4) during communication. When this occurs, the hold designating input is sensed by the system controller 14. Then, at step S402, the other party is informed, via the data interface 12, demultiplexer 15, line interface 16 and ISDN, of the fact that the line currently being used for communication has been put on hold. In order to notify the other party, use is made of a command message of a BAS message/CCITT non-standard mode of a BAS command attribute "111", by way of example. Further, if user/user information of D-channel call control is capable of being utilized, the notification may be made by user/user information.

Next, at step S403, the current communication mode is stored in the memory 17 in the apparatus on both the sending and receiving sides. For example, in case of the communication state shown in FIG. 14, each type of media and the mode states selected for the transfer rates as shown in FIG. 15 are stored. This is followed by step S404, at which the audio capability having the highest quality is selected from among the possible audio information capabilities on a single channel. The audio capability of the highest quality is capable of being selected with respect to the party communicated with at the present time. For example, in a case where the communication apparatus has the construction shown in FIG. 12, the capability table is as shown in FIG. 16. A 7 KHz audio capability is selected, upon referring to this capability table, as the highest quality capability among the possible audio information capabilities on one channel which, in this case, is one B channel.

Figure 17:
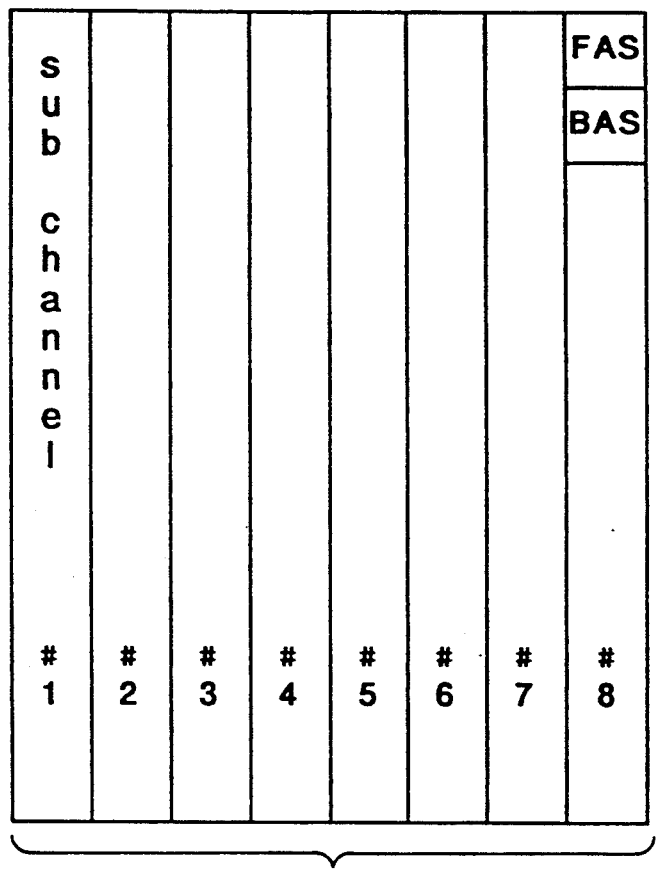
FIG. 17 is a diagram showing an example of channel allocation when a line is in use.

The selected audio mode is allocated to the first channel, the hold tone generating source 404 is activated and the hold tone from the hold tone generating source 404 is transmitted on the allocated channel at step S405. In addition, the hold tone is produced on the side of the user's apparatus as well. With this channel allocation, it will suffice to make the changeover as shown in FIG. 17 if the line-use state shown in FIG. 14 is in effect.

Since the preparations for hold are thus completed, additional channels from the second channel onward are released at step S406. In a case where the method employed is one in which user/user information is utilized to inform the other party of the hold and, moreover, the network utilized is one in which user/user information also can be used only when setting and releasing a call, the procedure of step S406 is carried out at the same time as the processing of step S402.

Next, at step S407, the system waits for a hold-release designation while the holding tone continues to be transmitted on the first channel. Since the fact that the holding state is in effect is recognized on both sides at this stage, the freed channel is put on reserve. When the hold-release designation has been entered from the control panel 13, the program proceeds from step S407 to step S408, where additional channels from the second channel onward released and placed on reserve at step S406 are reconnected. Next, at step S409, the system waits for the completion of synchronization processing on the side of the additional channels. When synchronization processing is completed, the program proceeds to step S410, at which transmission of the hold tone is halted. At this time, the sounding of the hold tone in the user's apparatus also is halted simultaneously.

At step S411, the transmission/reception modes of the apparatus on both the sending and receiving sides of the apparatus, which modes prevailed prior to the hold designation and were stored in the memory 17 at step S403, are read out of the memory and both are returned to states which prevailed prior to hold.

In the processing described above, it is permissible at step S408 or S410 to inform of hold release using the BAS command or the user/user information of D-channel call control in the same manner as the hold designation on the other party's side. In addition, as to whether or not reconnection of the additional channels from the other party is performed during hold, this is not particularly necessary since it is possible to sense this also by checking the other party's number during D-channel call control.

Furthermore, in the state of step S407, the channel released at step S406 is idle on the network side but is reserved on the side of the multimedia communication apparatus. Consequently, even if there is an incoming call from another apparatus under these conditions, the call will be refused by a busy signal.

In the present invention as described above, when hold is temporarily designated in a visual telephone apparatus performing multimedia communication utilizing a plurality of connections, a single connection is allocated to audio information, the audio coding method having the highest quality capable of undergoing intercommunication is selected, and then the hold tone is transmitted. As for the remaining connections, these are released when both sides have been made aware of temporary release by the holding operation, and the connections are secured until the release from hold is made.

At the same time, the transmission mode such as multiplexed allocation of each type of media prior to the hold is stored in both apparatus, the necessary additional connections are connected when hold release is designated, and means is provided for automatic recovery to the stored transmission mode.

Thus, when hold is designated at the time that multimedia communication is being performed utilizing a plurality of connections, the communication mode such as multiplexed information at the time of hold designation is stored, the other party is informed of the hold, the hold tone is transmitted upon selecting the audio coding method having the highest quality selectable utilizing only a single channel, and the other additional connections are released while being secured. As a result, it is possible to eliminate waste in which a communication tariff is charged for a superfluous connection during hold. Further, owing to transmission of a hold tone based upon selection of the highest quality coding, it is possible to avoid a situation in which an unnatural noise is sent to the other party.

Moreover, by assuring that a line will be available at the time of call release and automatically effecting recovery to the communication mode which prevailed prior to the hold, the user need only designate hold or hold release. Thus, a very easy-to-use, practical man-machine interface is provided.

In the foregoing embodiment, a method is described in which one channel is left, the entire channel is allocated to audio information and only the hold tone is transmitted. However, the present invention is not limited to the foregoing embodiment. In a case where it is desired to transmit another type of media at the time of hold, the medium may replace the audio or a multiplexed transmission may be made if multiplexing is possible within one channel.

It is possible also to release all channels while securing them after transmission of the hold designating command, generate a hold tone or the like on the other party's side by the other party itself, display on the user's side the fact that hold is in effect, and actually release the line while the line is secured, thereby further eliminating unnecessary communication tariffs.

In addition, though an extended BAS command and user/user information have been described as methods of designating hold, it is permissible also to allocate constant-speed data and stipulate commands within this data.

In accordance with this embodiment, as described above, it is possible to eliminate waste in which a communication tariff is charged for a superfluous connection during hold. Further, owing to transmission of a hold tone based upon selection of the highest quality coding, it is possible to avoid a situation in which an unnatural noise is sent to the other party. Moreover, by assuring that a line will be available at the time of call release and automatically effecting recovery to the communication mode which prevailed prior to the hold, the user need only designate hold or hold release. Thus, a very easy-to-use, practical man-machine interface is provided.

As many apparently widely different embodiments of the present invention can be made without departing from the spirit and scope thereof, it is to be understood that the invention is not limited to the specific embodiments thereof except as defined in the appended claims.

What is claimed is:

1. A multimedia communication apparatus for multiplexed intercommunication of a plurality of items of media information via a communication line, the media information comprising (i) video information and (ii) other information, the other information including (a) audio information, (b) code-data information, and (c) control information, comprising:

means for coding and decoding the audio information at a designated transmission speed;

means for transmitting and receiving the code-data information at a designated transmission speed;

means for coding and decoding the video information at a transmission speed which corresponds to the difference between a maximum transmission speed at which communication is possible via the communication line and a total transmission speed allocated to said other information; and means for providing an indication that the transmission speed which corresponds to said difference is inadequate for transmission of the video information if this transmission speed is less than a predetermined value.

2. The apparatus according to claim 1, wherein said communication line comprises a digital communication line which includes an ISDN.

3. A multimedia communication apparatus for multiplexed intercommunication of a plurality of items of media information via a communication line, the media information comprising (i) video information and (ii) other information including (a) audio information, (b) code-data information, and (c) control information, comprising:

means for coding and decoding the audio information at a designated transmission speed;
means for transmitting and receiving the code-data information at a designated transmission speed;
means for coding and decoding the video information at a transmission speed which corresponds to the difference between a maximum transmission speed at which communication is possible via the communication line and a total transmission speed allocated to said other information;
means for suspending transmission of the video information if the speed which corresponds to said difference is less than a predetermined value; and
means for providing an indication that the transmission of the video information has been suspended.

4. The apparatus according to claim 3, wherein said communication line comprises a digital communication line which includes an ISDN.

5. A multimedia communication apparatus for multiplexed intercommunication of a plurality of items of media information via a communication line, the media information comprising (i) video information and (ii) other information including (a) audio information, (b) code-data information, and (c) control information, comprising:

means for coding and decoding the audio information at a designated transmission speed;
means for transmitting and receiving the code-data information at a designated transmission speed;
means for coding and decoding the video information at a transmission speed which corresponds to the difference between a maximum transmission speed at which communication is possible via the communication line and a total transmission speed allocated to said other information;
means for suspending transmission of the video information if the speed which corresponds to said difference is less than a predetermined value; and
means for allocating the transmission speed which corresponds to said difference to the transmission and reception of said other information.

6. The apparatus according to claim 5, wherein said communication line comprises a digital communication line which includes an ISDN.

7. A multimedia communication apparatus for multiplexed intercommunication of a plurality of items of media information via a communication line, the media information comprising (i) video information and (ii) other information including (a) audio information, (b) code-data information, and (c) control information, comprising:

means for coding and decoding the audio information at a designated transmission speed;
means for transmitting and receiving the code-data information at a designated transmission speed;
means for multiplexing the plural items of media information in information-frame units in conformity with the information transfer rate of each item of media information;
means for separating the received plural items of media information, which have been multiplexed in information-frame units, according to each item of media information;
first control means for establishing a plurality of transmission and reception connections with said communication line, and for controlling transmission and reception of the multiplexed plural items of media information via said plurality of connections;
second control means for allocating a single connection among the plurality of connections to transmission of the audio information in response to a communication-hold designation made via said plurality of connections;
means for disconnecting all transmission and reception connections except for the single connection allocated from said plurality of connections by the second control means; and
means for resetting the disconnected connections based upon a disconnect designation with respect to the communication hold;
wherein when transmission of said other information is temporarily suspended and a hold-release designation is received at the time of hold, the connections which were in effect prior to suspension of transmission are re-established and multiplexed communication of the plural items of media information is restored.

8. The apparatus according to claim 7, wherein said communication line comprises a digital communication line which includes an ISDN.

9. The apparatus according to claim 7, wherein said second control means includes means for transmitting a hold tone corresponding to said hold via a connection allocated to transmission of the audio information.

10. The apparatus according to claim 7, wherein said second control means allocates a connection having the maximum transmission capability in a single connection to transmission of the audio information.

* * * * *

UNITED STATES PATENT AND TRADEMARK OFFICE
CERTIFICATE OF CORRECTION

PATENT NO. : 5,301,191
DATED : April 5, 1994
INVENTOR(S) : Otani

It is certified that error appears in the above-indentified patent and that said Letters Patent is hereby corrected as shown below:

<u>Column 6</u>

Line 21, "i.e, (of" should read --(i.e., of--.

<u>Column 7</u>

Line 29, "29" should read --numeral 29--.

Signed and Sealed this

Twentieth Day of December, 1994

Attest:

BRUCE LEHMAN

*Attesting Officer*   *Commissioner of Patents and Trademarks*